Figure 3:
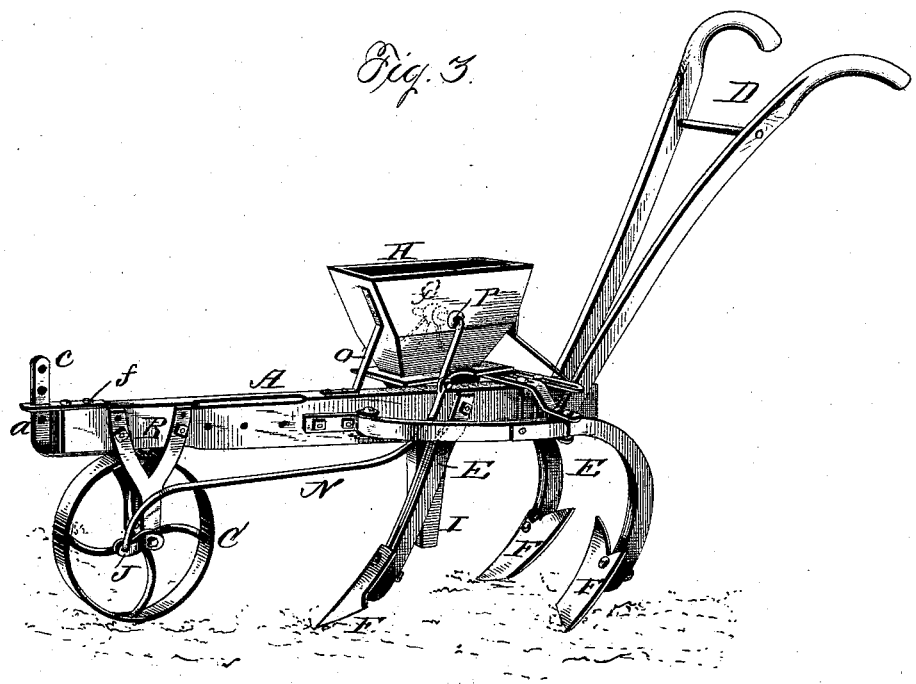

(No Model.) 2 Sheets—Sheet 1.
T. K. BOGGS.
COMBINED CULTIVATOR AND PLANTER.
No. 417,535. Patented Dec. 17, 1889.
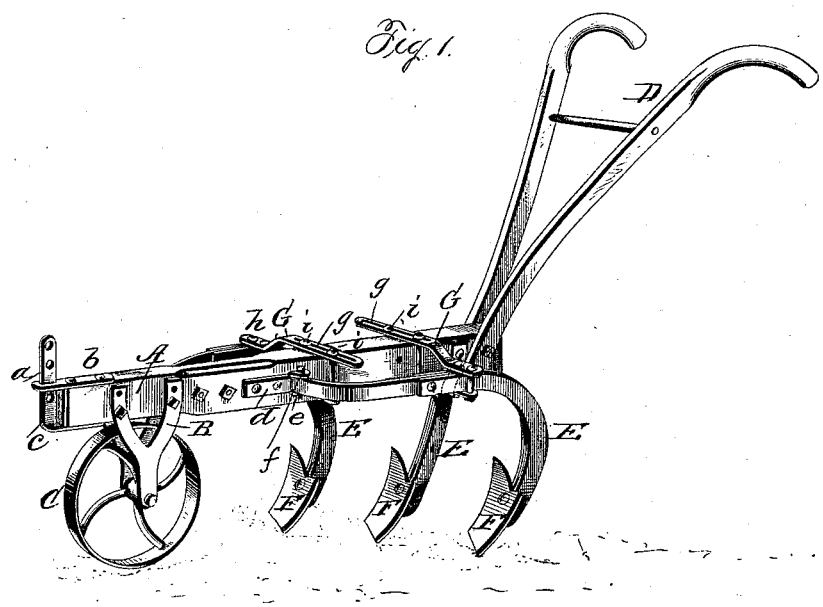
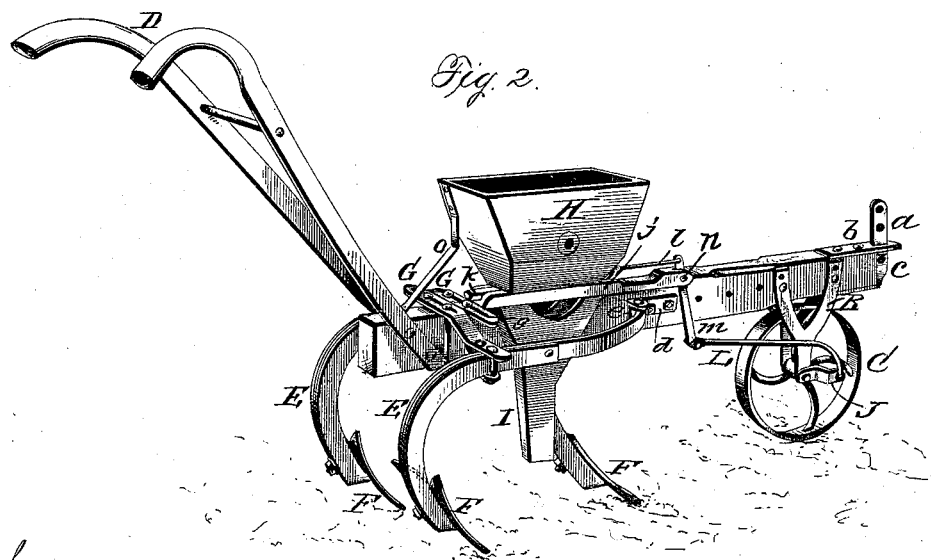
Witnesses
Chas. J. Williamson.
E. H. Bond.
Inventor
Thomas K. Boggs.
per Chas. H. Fowler,
Attorney.

(No Model.) 2 Sheets—Sheet 2.

T. K. BOGGS.
COMBINED CULTIVATOR AND PLANTER.

No. 417,535. Patented Dec. 17, 1889.

Witnesses
Chas. J. Williamson.
E. A. Bond.

Inventor
Thomas K. Boggs.
per Chas. H. Fowler,
Attorney.

UNITED STATES PATENT OFFICE.

THOMAS KENNEDY BOGGS, OF ROME, GEORGIA.

COMBINED CULTIVATOR AND PLANTER.

SPECIFICATION forming part of Letters Patent No. 417,535, dated December 17, 1889.

Application filed September 12, 1889. Serial No. 323,760. (No model.)

*To all whom it may concern:*

Be it known that I, THOMAS KENNEDY BOGGS, a citizen of the United States, residing at Rome, in the county of Floyd and State of Georgia, have invented certain new and useful Improvements in a Combined Cultivator and Planter and Guano-Drill; and I do hereby declare that the following is a full, clear, and exact description of the same, reference being had to the annexed drawings, making a part of this specification, and to the letters of reference marked thereon.

This invention relates to certain new and useful improvements in cultivators and planters; and the novelty resides in the peculiar combinations and the construction, arrangement, and adaptation of parts, all as more fully hereinafter described, shown in the drawings, and then particularly pointed out in the appended claim.

The invention is clearly illustrated in the accompanying drawings, which, with the letters of reference marked thereon, form a part of this specification, and in which—

Figure 4:
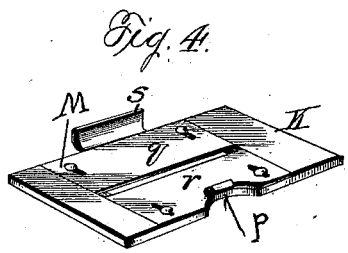

Figure 1 is a perspective view of a cultivator embodying my invention. Fig. 2 is a like view of the same with the planting attachments applied. Fig. 3 is a like view from the opposite side of Fig. 2, with the fertilizer-distributer appliances attached. Fig. 4 is a perspective view of the bottom of the hopper for fertilizer detached.

Referring to the details of the drawings by letter, A designates the beam, to the forward end of which the draft attachment or clevis $a$ is attached. This draft attachment consists of the metallic strip $b$, attached to the upper face of the front end of the beam and extending beyond the same, and the metallic piece $c$, attached to the under side of the beam or tongue and having a vertical portion passed through a hole in the extended end of the strip $b$ and provided with a plurality of holes, as shown.

B are hangers attached to the forward end of the beam, and carried by a suitable shaft journaled in the lower ends of these hangers is the wheel C, of any known construction.

D are the handles, attached to the rear end of the beam.

E are plow-standards, curved as shown and carrying at their lower ends the detachable plows F. These standards are pivotally connected to the beam at their upper ends, preferably in the following manner:

$d$ is a plate attached to the side of the beam and provided with lateral ears $e$, between which the end of the plow-standard is pivoted on the vertical pivot $f$, which passes through an eye on the end of the standard.

G are horizontal arms formed with elongated slots $g$ and with an offset $h$, the said arms being held to the beam by means of the vertical bolts $i$, which pass through the slot, one upon each side of the beam, and have heads which prevent them from passing through the slot; or they may be clips, if preferred. The outer ends of these arms are connected with the plow-standards, as shown, so that by the moving in or out of the arms G the position of the plows may be changed, the said plow-standards being adapted to move on the arc of a circle and readily held in their adjusted positions by the tightening of the securing means of the said arms.

In Fig. 1 the device is shown as adapted for cultivating purposes, the plows or shovels being all arranged in line. The central plow is preferably carried by a straight standard, and said standard is preferably rigidly attached to the beam, as it is never designed to be changed, the adjustment of the other two providing for the different relative positions of the plows.

In Fig. 2 I have shown the device equipped for planting seed. The only change from Fig. 1 necessary to form the planter is to adjust the two pivoted plow-standards, so as to bring them in the same transverse line and add the hopper H and spout I and the following devices:

$j$ is a plate designed to be readily attached to the upper face of the beam and formed with guideways for the seed-slide $k$, said slide being connected at its forward end with a rod or link $l$, the other end of which is pivotally connected with the vertical lever $m$, pivoted at $n$ in the bifurcation of one end of the plate $j$, and at its lower end connected with the short pitman L, which is attached to a crank-arm J on the shaft of the wheel C. The hopper is braced by means of the inclined brace $o$. The central plow works just in advance of the spout, and in the forward movement of the machine the seed-slide is operated through the medium of the crank, pitman, lever, and link in a manner which will be readily understood.

When used as a fertilizer-distributer, the plate j is removed and in its place is inserted a removable bottom K, (shown best detached in Fig. 4,) formed with a semicircular opening p in one side to provide for the movement of the agitator-shaft, and provided with two adjustable plates q and r, held in suitable guides and adjustable to and from each other by means of the slots and screws, as shown.

M is a slide to entirely close the opening between the plates q and r when necessary. This is provided with a suitable thumb-hold s, as shown in Fig. 4.

Instead of the short pitman and its intermediate devices, (shown in Fig. 2,) I employ a long pitman N, connected to the crank J on the shaft of the wheel C, the other end of which is connected to the crank of the agitator-shaft P, which is journaled in the side walls of the hopper and carries within said hopper an agitator Q of known construction.

What I claim as new is—

The combination, with the beam and the plate j, attached to the upper face thereof and formed with guides for the seed-slide and bifurcated upon one side at its forward end, of the seed-slide, the crank on the shaft of the guide-wheel, the lever pivoted in the bifurcation of the plate, the link connecting one end of the lever with the seed-slide, and the pitman connecting the other end of the lever with the crank on the said shaft, substantially as described.

In testimony that I claim the above I have hereunto subscribed my name in the presence of two witnesses.

THOMAS KENNEDY BOGGS.

Witnesses:
JOHN NICHOLSON,
A. E. ROSS.